United States Patent [19]

Hwang

[11] Patent Number: 4,875,182

[45] Date of Patent: Oct. 17, 1989

[54] MINIATURE DIGITAL COMPUTER CIRCUIT FOR DETERMINING VALUES OF COMBINED VARYING QUANTITIES

[75] Inventor: Yu-Tsang G. Hwang, Dix Hills, N.Y.

[73] Assignee: Republic Electronics Company, Hauppauge, N.Y.

[21] Appl. No.: 73,004

[22] Filed: Jul. 13, 1987

[51] Int. Cl.⁴ ............................................. G06F 15/328
[52] U.S. Cl. ................................................... 364/732
[58] Field of Search ......................... 364/715, 732, 735

[56] References Cited

U.S. PATENT DOCUMENTS

| | | | |
|---|---|---|---|
| 3,564,223 | 2/1971 | Harris et al. | 364/735 |
| 4,061,906 | 12/1977 | Grebe et al. | 364/735 |
| 4,817,027 | 3/1989 | Plum et al. | 364/732 |

FOREIGN PATENT DOCUMENTS

| | | | |
|---|---|---|---|
| 0696473 | 11/1979 | U.S.S.R. | 364/732 |
| 0758194 | 8/1980 | U.S.S.R. | 364/870 |

Primary Examiner—Gary V. Harkcom
Assistant Examiner—Dale M. Shaw
Attorney, Agent, or Firm—Edward H. Loveman

[57] ABSTRACT

A miniature digital computer circuit capable of operating in substantially instantaneous real time for determining values of combined varying quantities. The circuit has inputs for two variable digital pulse trains. A decoder and shift register compress bit groups to minimize sizes and operating times of associated digital pulse readout memories, multipliers and adders. The circuit adds to combined functions of the varying quantities the sum of significant terms from a differential expansion of the function, to obtain readouts representing changes in the functions.

5 Claims, 2 Drawing Sheets

MINIATURE DIGITAL COMPUTER CIRCUIT FOR DETERMINING VALUES OF COMBINED VARYING QUANTITIES

BACKGROUND OF THE INVENTION

In the following subject matter the term "function", as designated by the symbol F, is used to denote a variable quantity expressible algebraically whose instantaneous numerical value is dependent on the instantaneous value of some other variable quantity of some physical condition. The symbols X and Y are used to designate values of different quantities related to each other in some way. Thus, X(t) and Y(t) represent functions of time varying values of X and Y, and F(X,Y) represents a function expressed in terms of the combined varying values X and Y.

1. Field of the Invention

This invention relates to the art of digital computer circuits used for calculating functions with multiple variables, and more particularly concerns a miniature digital computer circuit for combining plural variable digital pulse inputs, to produce in substantially instantaneous real time, output pulses, which represent the changing value of the combined variable inputs.

2. Description of the Prior Art

Only computers having large memories, such as supercomputers, are capable of combining and calculating in reasonably short real times, a plurality of functions having multiple variable values. Even these large computers require real times of at least several seconds to scan and match an infinitely large number of stored values with a plurality of incoming functions having variable values, to produce pulse readouts representing the changing values of the combined variable functions. When such readouts are required substantially instantaneously, i.e. in less than 10 microseconds, none of the computers of any size or capacity currently known can perform satisfactorily. This is a serious handicap in those business, industry, science, engineering, and military applications requiring such instantaneous calculations.

SUMMARY OF THE INVENTION

The present invention takes a new approach to the problem of combining multiple variables pulse inputs to produce in substantially instantaneous real time, output pulses representing the changing values of the combined variable inputs. According to the invention there is provided a miniature, portable, digital computer circuit having two inputs to which digital pulses representing two variable functions are applied. The two variable functions are combined in the circuit to produce a Taylor type partial differential expansion of the form $$\Delta F(X,Y) = \frac{\partial F(X,Y)}{\partial X} \Delta X + \frac{\partial F(X,Y)}{\partial Y} \Delta Y + \frac{1}{2} \frac{\partial^2 F(X,Y)}{\partial X \partial Y}$$

Only the first two first order terms T1, T2 are processsed in the present circuit to produce the required variable, combined pulse readout. In the expansion equation X and Y are variable quantities, F(X,Y) is the function of the combined variable quantities expressed in terms of X and Y. $\Delta F(X,Y)$ is the instantaneous change in the function of the X and Y variables, $\partial F$, $\partial X$, and $\partial Y$ are partial differentials of the first order values of F, X, and Y respectively. $\partial 2F(X,Y)$ is the second order differential of the function F(X,Y).

In a specific application of the invention to determine the changing location of an object in space with respect to ground from a given point of observation, the location of the object can be expressed as "slant range":

$$SR = F(X,Y) + \Delta F(X,Y) \qquad \text{(Equation 1);}$$

where $\Delta F$ is the function represented by the sum of the two first order terms of the Taylor type of differential expansion:

$$\Delta F(X,Y) = \frac{\partial F(X,Y)}{\partial X} \Delta X + \frac{\partial F(X,Y)}{\partial Y} \Delta Y \qquad \text{(Equation 2)}$$

X represents the angular elevation of the object, and Y represents the height above ground or the horizontal ground range to the object.

In a flight simulator for training purposes, if pulses representing varying elevation and height (or horizontal ground ranges are fed into the receiving antenna of a radar receiver, the slant range SR can be determined by use of the present invention whose readout is as set forth in Equation (1) above. Then the radar receiver will display the changing location of a simulated object which would be indistinguishable on the radar screen from an actual object in space.

In another application of the invention two functions representing speed and direction of an object in space can be fed into the module. This will produce an output which enables a fire control device to aim a missile at the object.

The digital circuit which makes these applications as well as numerous other applications possible is a novel arrangement of a decoder, shift register, pulse readout memories, and adders. The circuit is embodied in a miniature, easily portable module. Thus, the invention makes possible determinations of multiple variable functional values substantially instantaneously in a few (less than 10) microseconds of real time, which is a result no other computer or computer unit, large or small can now perform.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 1:
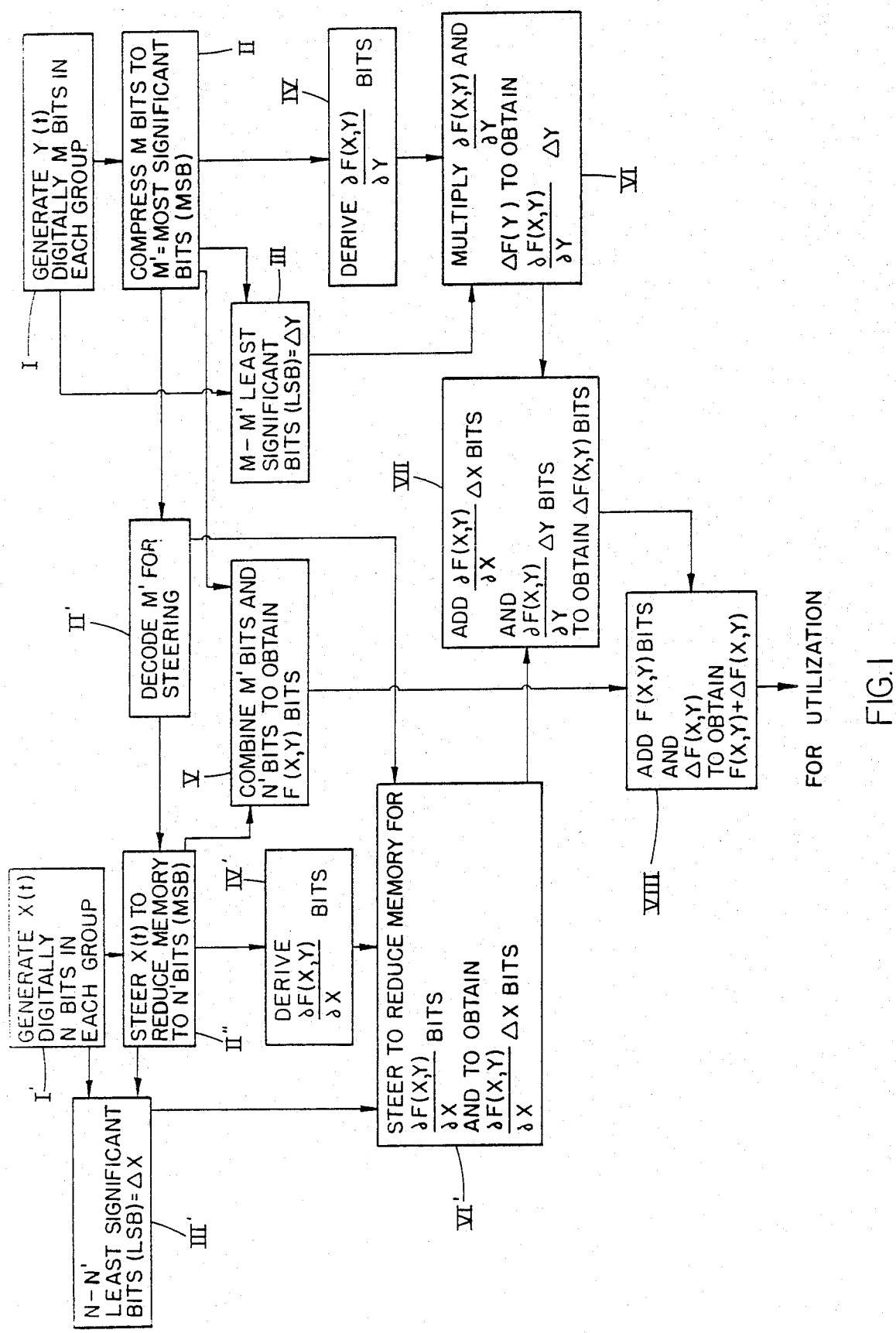
FIG. 1 is a flow chart diagram of a method of operation of the invention as exemplified in FIG. 2.

Referring now to the drawings wherein like reference characters designate like or corresponding parts throughout, there is shown in FIG. 1 a flow chart setting forth the basic steps involved in obtaining a readout of digital bits representing the desired indication of instantaneous magnitudes, values or quantities at all times as they change.

In step I, a stream of digital signals is generated in succesive groups having M bits in each group, and representable as Y(t), i.e. as a function of a continuously varying parameter such as time. Simultaneously with step I, a stream of digital signals is generated in step I', in successive groups having N bits in each group, and representable as X(t), i.e. as a function of time for a continuously varying value X interrelated in some way with varying value Y. In step II, a subgroup of a predetermined number M' of most significant bits is selected from each group of M bits. The stream of M' bits is used as an equivalent to Y and are decoded in step II' are applied to a register in step II" where the N bits are compressed to form N' bits. The decoded M' bits of step II' steer the X(t) bits for reducing the size of the memory needed for X(t), ie. N' bits.

In step III, occurring after step II, a subgroup of a predetermined number M-M' of least significant bits (LSB) are selected to form a series of subgroups of bits which are equivalent to $\Delta Y$, the instantaneous change in the value of Y. In step III' occurring after steps II, II' and II", a predetermined number N-N' of least significant bits (LSB) are selected to form a series of subgroups of bits which are equivalent to $\Delta X$, i.e. the instantaneous change in value of X.

In step IV occurring after step III, $\partial F(XY)/\partial Y$ bits representing the partial derivative of function F with respect to value Y are derived from the M' bits obtained in Step II. In step IV' occurring after steps III and III', the $\partial F(X,Y)/\partial X$ bits which represent the partial derivative of function, F with respect to value X are derived from the N' bits obtained in step II"

In step V the N' and M' bits respectively obtained in steps II and II" are combined to obtain a stream of bit groups having the format F(X,Y), i.e. a function of the simultaneously occurring quantities or values X and Y.

In step VI occurring after step V, the $\partial F(XY)/\partial Y$ bits derived in step IV and the $\Delta Y$ bits derived in step III are multiplied to obtain $\partial F(X,Y)/\partial Y \, \Delta Y$ bits corresponding to the first order Y term of the Taylor type expansion of the function F(X,Y).

In step VI' the $\partial F(X,Y)/\partial X$ bits derived in step IV' are steered by the decoded M' bits from step II' to reduce the size the memory in multiplying the $\partial F(X,Y)/\partial X$ bits derived in step IV' by the $\Delta X$ bits derived in step III', to obtain $\partial F(X,Y)/\partial X \, \Delta X$ bits which correspond to the first order X term of a Taylor type differential expansion of the function F (X,Y).

In step VII the bits of the first order X and Y terms obtained in steps VI and VI' are added to obtain groups of bits representing $\Delta F(X,Y)$ which is the instantanteous change, with respect to the X and Y values, of the function F(X,Y).

In step VIII the F(X,Y) bits obtained in step V are added to the $\Delta F(X,Y)$ bits obtained in step VII to obtain bits represented by the summation $F(X\,Y)+\Delta F(X,Y)$ which bits are the successive instantaneous changes in the F(X,Y) bits. These summation bits can then be applied in any desired further utilization procedure. The foregoing steps I through VIII occur in less than 10 microseconds of real time.

Figure 2:
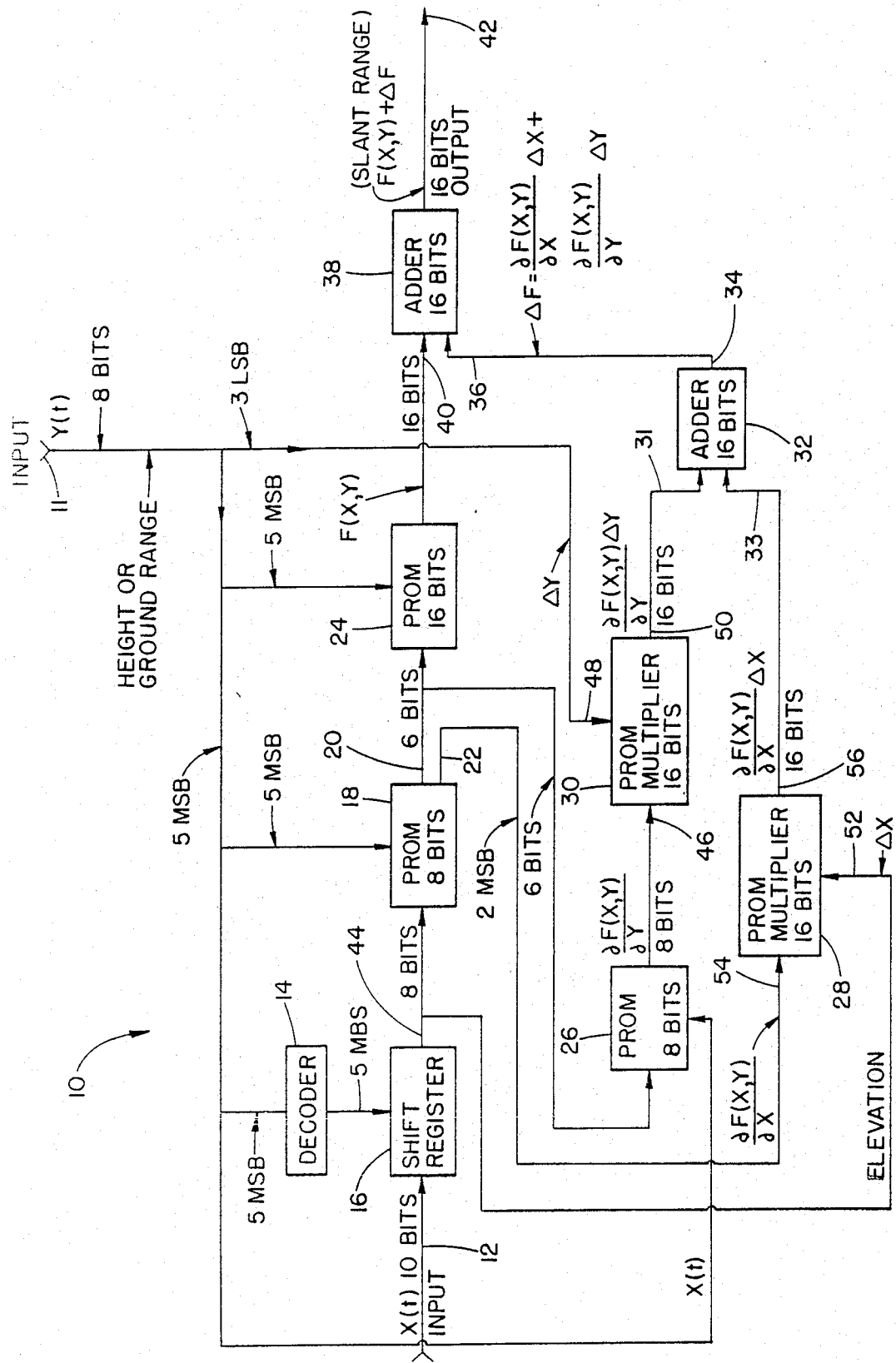
FIG. 2 is a combined logic and block diagram of a modular computer unit embodying the invention.

Referring now to FIG. 2 there is shown a digital circuit 10 embodying the invention and capable of performing the steps outlined above. The circuit 10 has two digital inputs 11, 12. The input 11 is connected to a digital decoder 14 connected to a digital shift register 16 which is connected to a first pulse readout memory (PROM) 18 having two outputs 20, 22. The output 20 is connected to a PROM 24 and to a PROM 26. The output 22 is connected to a multiplier PROM 28. The PROM 26 is connected to a multiplier PROM 30. The outputs from the PROMS 30 and 28 are applied to two respective inputs 31, 33 of a digital adder 32. An output 34 from the adder 32 is connected to one input 36 of a digital adder 38. An output from the PROM 24 is applied to another input 40 of the adder 38. An output 42 from the adder 38 yields the desired readout pulses representing the combination of pulses applied to the adder 38. These readout pulses may be applied to any suitable utilization device or system. As one example, the readout pulses may be applied to a digital-to-analog convertor to drive a graphical display device, radio frequency receiver, printer, telemeter, etc.

It should be noted at this point that the provision of the decoder 14 and the shift register 16 makes it possible to compress the numbers of bits in the incoming groups of bits, so that smaller PROMS, multipliers and adders may be used having faster real times of operation. It is the miniaturization of these circuit components that makes possible substantially instantaneous real time operation of the modular circuit 10, i.e. just a few microseconds.

The mode of operation of the modular circuit 10 will now be described with reference to a particular application, namely, the determination of the instantaneous, variable location of a moving object in terms of slant range. If two values or quantities are given or defined at all points, i.e. angular elevation with respect to ground of the object, and height with respect to ground, then the slant range is determinable and the moving object may be continuously located and tracked.

Referring now to the drawing, let it be supposed that now a first series of digital pulses representing the height Y of a moving object is applied to the input 11. The digital pulse input of height Y will be made to appear as successive groups of 8 bits. The pulse train at the input 11 may be expressed as a function Y(t), where the successive groups of 8 bits represent successive instantaneous heights of the continuously moving object. At the same time, a second series of digital pulses presenting the angular elevation of the moving object is applied to the input 12. The digital pulse input of elevation X will be made to appear as successive groups of 10 bits. The pulse train at the input 12 may be expressed as a function X(t) where the successive groups of 10 bits represent successive instantaneous elevations of the continuously moving object. The 8 bit pulses of height function Y(t) are applied to the circuit as a data input. Decoder 14 utilizes the first five most significant bits (MSB) which are applied to the shift register 16. The decoder triggers the shift register to which the 10 bit groups of elevation X are applied to obtain an output 44 which is compressed to 8 bits. It will be noted that starting with the 8 Y bits and the 10 X bits there is derived a corresponding group of eight bits which is sufficient to drive the PROM 18 which produces at the output 20, six bits which are applied to the PROM 26. The output from the PROM 26 is eight bits representing the partial differential of function F(x,Y), i.e. $\partial F(X,Y)/\partial Y$, and is applied to the input 46 of the 16 bits PROM multiplier 30. At the same time, each successive change in value or magnitude of height Y is applied as $\Delta Y$ pulses to the PROM input 48 of the PROM 30. The output 50 from the PROM 30 is 16 bits constituting or representing the product of multiplication of the two inputs 46 and 48. The output 50 is a group of pulses representing the partial differential term $\partial F(X,Y)/\partial Y \, \Delta Y$ which is applied to the input 31 of the 16 bit adder 32.

At the same time that the pulses are being processed through the PROM 26 and 30 which occupies no more than a few microseconds, elevation change pulses ΔX are being applied to the input 52 of the 16 bit PROM multiplier 28. Simultaneously, the two most significant bits (MSB) derived from the output 22 of the PROM 18 are applied to the input 54 of the PROM multiplier 28 and represent the partial differential of the function F(X,Y) i.e. ∂F(X,Y)/∂X. In the PROM multiplier 28 the two inputs 52, 54 are multiplied to produce at the output 56 a group of sixteen bits representing the differential product ∂F(X,Y)/∂X ΔX. This product is applied to the input 33 of the adder 32. The two inputs 31 and 33 are added to produce at the output 34 a group of 16 bits representing the instantaneous change in function F(X,Y), namely ΔF(X,Y) which as indicated in the diagram is equal to the differential expression $$\frac{\partial F(X,Y)}{\partial X} \Delta X + \frac{\partial F(X,Y)}{\partial Y} \Delta Y$$

This output 34 represents the two first order terms of the Taylor type partial differential expansion of the function F(X,Y). The output 34 is applied to the input 36 of sixteen bit adder 38. At the same time the sixteen bit output from the PROM 24 represents the function F(X,Y) which is applied to the input 40 of the sixteen bit adder 38. The sum of the two inputs 36 and 40 appears as a sixteen bit output 42 representing the slant range F(X,Y)+ΔF(X,Y). Thus, the object is unambigiously continuously located at all times. Successive point locations of the object as it moves are taken only a few microseconds apart so that the object may be continuously tracked.

The present invention has two overwhelming advantages over current computer systems. One is the vastly greater speed of operation and the other is the miniature size of the digital circuit embodying the invention. As far as speed is concerned, the present invention can do in microseconds of real time what a large computer would require several seconds of real time to perform. In other words the present invention works at speeds hundreds of thousands to millions of times faster. As far as size of equipment is concerned, the present module employs no more than ten microchips. With appropriate design the module may be reduced in size to one, two, or three chips. Power consumption for operation is neligible. By contrast a conventional computer which can produce the results performed by the present invention, although at objectionably slower speeds, would be thousands to millions of times larger and would consume large amounts of power to operate.

A basic reason why the present invention operates so much faster than a conventional large capacity computer is that the present digital circuit uses the coordinates of a very, very small two dimensional area in space to define each point at which the moving object is instantaneously located. By contrast a conventional large capacity computer has to scan the entire 360 degree pattern of a grid in space. This pattern consists of multimillions of points and requires several seconds or more to complete the entire scan, find the object sought, and to track it in space. That is why the real time of operation of a large scale computer is so much longer than that of the present invention.

Although the invention has been described in an application to a particular object location and tracking problem, it should be understood that present invention can be used to solve an infinite variety of problems in business, industry, science, engineering, military, and other applications where the problems can be defined or expressed as involving two interrelated variable functions. By establishing a Taylor type differential expansion of the functions to obtain their differential expressions, the two first order partial differential terms can be utilized to obtain the desired combination of variable functions.

It should be understood that the foregoing relates to only preferred embodiments of the invention which have been by way of examples only, and that it is intend to cover all changes and modifications of the example of the invention herein chosen for the purpose of the disclosure, which do not constitute departures from the spirit and scope of the invention.

What is claimed is:

1. A miniature digital computer circuit comprising:
   first and second sources of digital data signals respectively representing a first function having the format X(t), where X(t) is a function of t which is a continually varying first quantity, and a second function having the format Y(t), where Y(t) is a second function of t which is a continually varying second quantity, said digital data signals having the format of two trains of successive groups of pulses, said groups of pulses in each of said trains having a prescribed number of bits;
   first and second pulse readout memory means connected to said first and second data signal sources and arranged to produce first and second partial derivative digital readouts having the respective formats ∂F(X,Y)/∂X and ∂F(X,Y)/∂Y, where ∂F(X,Y)/∂X and ∂F(X,Y)/∂Y represent the partial derivatives of the function F(X,Y) taken only with respect to said first and second functions, and ∂X, ∂Y represent the partial differentials of said first and second varying quantities;
   first digital multiplier means connected to said first memory means and said first data signal input source for receiving therefrom and multiplying said first partial derivative of digital readout data pulses by ΔX, where ΔX represents the instantaneous change in quantity X from instant to instant, to produce a first digital multiplication product having the format ∂F(X,Y)/∂X ΔX;
   second digital multiplier means connected to said second memory means and said second data signal input source for multiplying said second partial derivative digital readout data pulses by ΔY, where ΔY represents the instantaneous change in said second quantity from instant to instant, to produce a second digital multiplication product having the format ∂F(X,Y)/∂Y ΔY; and
   digital adder means connected to said first and second multiplier means to receive said digital multiplication products therefrom and to add said products together to produce a digital sum having the format ΔF(X,Y), where
   ΔF(X,Y)=∂F(X,Y)/∂X ΔX+∂F(X,Y)/∂Y ΔY, and where ΔF(X,Y)
represents the two first order terms of the partial derivative expansion of the function F(X,Y).

2. A miniature digital computer circuit as defined claim 1, further comprising another digital adder means connected to said first memory means and said first named adder means to obtain therefrom and to add together digital pulses representing said functions F(X,Y) and ΔF(X,Y) respectively, to produce in real time a final digital output representing the continuously changing values of the function of combined variable inputs X and Y from instant to instant.

3. A miniature digital computer circuit as defined in claim 2, further comprising a shift register means connected to said first and second signal sources and said first pulse readout memory means, said shift register means being arranged to minimize the number of bits in each of said groups thereof applied to said first pulse readout memory means, thereby to minimize the required sizes and real times of operation of said first and second pulse readout memory means, of said first and second digital multiplier means, and of said first named and said other adder means.

4. A miniature digital computer circuit as defined in claim 3, further comprising decoder means connected to said second signal source to derive a prescribed number of most significant bits from each group of pulses supplied by said second signal source, said decoder means being connected to said shift register means to control the number of bits in each group thereof applied to said first pulse readout memory means.

5. A miniature digital computer circuit as defined in claim 4, further comprising circuit means connected between said first signal source and said first digital multiplier means, and arranged to apply to said first multiplier means a prescribed minimum number of least significant bits from each group of said pulses supplied by said first signal source to define said digital readout pulses ΔX.

* * * * *